United States Patent
Chamberlin et al.

(10) Patent No.: US 11,128,189 B2
(45) Date of Patent: Sep. 21, 2021

(54) ELECTRIC MACHINE STATOR WITH COMPACT CONFIGURATION

(71) Applicant: BorgWarner Inc., Auburn Hills, MI (US)

(72) Inventors: Bradley D. Chamberlin, Pendleton, IN (US); Kirk Neet, Pendleton, IN (US)

(73) Assignee: BorgWarner Inc., Auburn Hills, MI (US)

(*) Notice: Subject to any disclaimer, the term of this patent is extended or adjusted under 35 U.S.C. 154(b) by 140 days.

(21) Appl. No.: 15/927,938

(22) Filed: Mar. 21, 2018

(65) Prior Publication Data

US 2018/0278110 A1    Sep. 27, 2018

Related U.S. Application Data

(60) Provisional application No. 62/474,444, filed on Mar. 21, 2017.

(51) Int. Cl.
*H02K 3/28* (2006.01)
*H02K 1/16* (2006.01)
(Continued)

(52) U.S. Cl.
CPC ............... *H02K 3/28* (2013.01); *B60K 6/26* (2013.01); *B60K 6/40* (2013.01); *B60K 6/48* (2013.01);
(Continued)

(58) Field of Classification Search
CPC .......... H02K 1/165; H02K 1/176; H02K 3/12; H02K 3/26
(Continued)

(56) References Cited

U.S. PATENT DOCUMENTS 6,306,057 B1   10/2001   Morisawa et al.
6,501,205 B1 * 12/2002   Asao .................. H02K 3/12
                                                  310/184
(Continued)

FOREIGN PATENT DOCUMENTS

EP    1109292 A2    6/2001
JP    2005051981 A  2/2005
WO    2006107993 A1 10/2006

OTHER PUBLICATIONS

"Salient pole." Merriam-Webster.com Dictionary, Merriam-Webster, https://www.merriam-webster.com/dictionary/salient%20pole. Accessed Nov. 15, 2020. (Year: 2020).*
(Continued)

*Primary Examiner* — Thomas Truong
(74) *Attorney, Agent, or Firm* — Maginot, Moore & Beck LLP

(57) ABSTRACT

A stator assembly (50) includes a stator core (52) defining an outside diameter (OD) and an inside diameter (ID) with longitudinally extending slots (58) formed between the inside diameter and the outside diameter. The stator core (52) defines a core height extending longitudinally from a first end (53) to a second end (55) of the stator core (52). Distributed windings (60) are retained by the stator core (52) and include an in-slot portion (66) positioned in the slots of the stator core (52), a first end turn portion (62) adjacent to the first end (53) of the stator core, and a second end turn portion (64) adjacent to a second end (55) of the stator core. The first end turn portion (62) defines a first end turn height ($h_1$) extending from the first end (53) of the stator core to a vertex (78) of the first end turn portion (62). A ratio of the first end turn height ($h_1$) to the outside diameter (OD) of the stator core is less than or equal to 0.07.

20 Claims, 9 Drawing Sheets

(51) Int. Cl.
  *H02K 1/27* (2006.01)
  *H02K 3/12* (2006.01)
  *H02K 7/00* (2006.01)
  *B60K 6/40* (2007.10)
  *B60K 6/48* (2007.10)
  *B60K 6/26* (2007.10)
  *H02K 7/108* (2006.01)

(52) U.S. Cl.
  CPC .............. *H02K 1/276* (2013.01); *H02K 3/12* (2013.01); *H02K 7/006* (2013.01); *B60K 2006/268* (2013.01); *B60K 2006/4825* (2013.01); *H02K 1/165* (2013.01); *H02K 7/108* (2013.01); *H02K 2213/03* (2013.01); *Y10S 903/906* (2013.01); *Y10S 903/912* (2013.01)

(58) Field of Classification Search
  USPC .......................................... 310/179, 180, 184
  See application file for complete search history.

(56) References Cited

U.S. PATENT DOCUMENTS

| | | | |
|---|---|---|---|
| 2003/0214196 A1* | 11/2003 | Cai | H02K 3/14 310/208 |
| 2013/0088127 A1* | 4/2013 | Ogawa | H02K 24/00 310/68 B |
| 2014/0191624 A1 | 5/2014 | Jahshan | |
| 2014/0265683 A1 | 9/2014 | Hossain | |
| 2015/0061453 A1* | 3/2015 | Taniguchi | H02K 1/165 310/216.074 |
| 2018/0238291 A1* | 8/2018 | Kiehn | F02B 67/06 |

OTHER PUBLICATIONS

International Search Report in corresponding application PCT/US2018/023627, dated Jul. 11, 2018.

* cited by examiner

ELECTRIC MACHINE STATOR WITH COMPACT CONFIGURATION

CROSS-REFERENCE TO RELATED APPLICATIONS

This application claims priority from U.S. Provisional Patent Application No. 62/474,444, filed Mar. 21, 2017, the entire contents of which are incorporated herein by reference.

FIELD

This document relates to the field of electric machines, and particularly electric machines with distributed stator windings for use in vehicles.

BACKGROUND

Dynamoelectric machines in automotive and other vehicle applications include alternators, alternator-starters, traction motors, hybrid drive motors, as well as other applications. The stator of an electric machine typically includes a cylindrical core formed as a stack of individual laminations and having a number of circumferentially spaced slots that extend axially through the stator core. A rotor assembly includes a center shaft and is coaxial with the stator core. The stator core has wires wound thereon in the form of windings that extend axially through ones of the core slots. End turns are formed in the windings at the two axial ends of the stator core, a given winding having an end loop as it extends circumferentially to a different slot. In this general manner, a stator winding extends axially from end to end in selected ones of the plurality of stator core slots and extends circumferentially between slots, according to a chosen wiring pattern.

The stator may be formed with any number of separate phase windings, such as three-phase, five-phase, six-phase, etc., and such determines the general wiring pattern to be implemented when winding the stator core. Stator windings may be provided in different shapes and configurations, including concentrated stator windings and distributed stator windings. Concentrated stator windings provide for clearly defined poles on the stator, with each slot of the stator defining a single pole. Concentrated windings are typically formed from an elongated conductor that is wound multiple times around a tooth of the stator with the N and S poles being defined by the winding direction within each slot. Concentrated windings are advantageous because they provide for a low end-turn height, thus allowing the electric machine to have a reduced size. Additionally, concentrated windings may be easily configured to a particular torque-speed curve profile by adapting the windings to a desired number of winding turns and wire diameter. Unfortunately, concentrated windings tend to have a lower slot fill and a relatively high level of acoustic noise.

Unlike concentrated windings, distributed windings are formed by placing conductors in several slots in order to form a single pole. As a result distributed windings provide for windings that are more spread out and "distributed" across the stator with various winding phases overlapping in different slots. Distributed windings typically have a higher end-turn height than concentrated windings because the conductors must span across many slots at the end-turns. However, notwithstanding a typically larger end-turn height, distributed windings have several advantages over concentrated windings including desirable performance characteristics and less acoustic noise.

Distributed concentrated windings may be used by a manufacturer, depending on the particular application for the electric machine. For example, if space considerations are important, the manufacturer may tend to use concentrated windings. However, if acoustic noise is an important consideration, the manufacturer may tend to use distributed windings.

In view of the foregoing, it would be advantageous to provide an electric machine having a reduced end-turn height, thereby saving space within the particular application environment. It would also be advantageous if such electric machine could include distributed windings for improved performance and reduced acoustic noise.

SUMMARY

In accordance with one exemplary embodiment of the disclosure, there is provided a stator assembly comprising a stator core with distributed windings retained by the stator core. The stator core defines an outside diameter and an inside diameter with longitudinally extending slots formed between the inside diameter and the outside diameter. The stator core further defines a core height extending longitudinally from a first end to a second end of the stator core. The distributed windings include an in-slot portion positioned in the slots of the stator core, a first end turn portion adjacent to the first end of the stator core, and a second end turn portion adjacent to a second end of the stator core. The first end turn portion defines a first end turn height extending from the first end of the stator core to a vertex of the first end turn portion. A ratio of the first end turn height to the outside diameter of the stator core is less than or equal to 0.07.

Pursuant to another exemplary embodiment of the disclosure, there is provided an electric machine comprising a rotor and a stator assembly. The stator assembly includes an outside diameter and an inside diameter. The rotor is positioned at least partially within the inside diameter of the stator assembly. The stator assembly includes a stator core defining the outside diameter and the inside diameter, and distributed windings having an in-slot portion and two end turn portions provided on opposite ends of the stator assembly. A ratio of a height of one of the two end-turn portions to the outside diameter of the stator assembly is less than or equal to 0.07. A first clutch is positioned at least partially within the rotor. A second clutch is positioned adjacent to the rotor. The stator assembly, rotor, first clutch and second clutch are all retained in a common housing.

In accordance with yet another exemplary embodiment of the disclosure, there is provided a vehicle comprising an engine having an output shaft, a transmission, an engine disconnect clutch, and an electric machine. The transmission is coupled to the engine with a space defined between the transmission and the engine, the space is defined at least in part by an axial distance separating the engine and the transmission. An engine disconnect clutch is positioned in the space between the transmission and the engine, the engine disconnect clutch connected to the output shaft of the engine. At least one vehicle drive member is coupled to the transmission. The electric machine is positioned in the space between the transmission and the engine, the electric machine including a rotor and a stator assembly, the stator assembly including a stator core and distributed windings, and the engine disconnect clutch positioned at least partially within the rotor.

The above described features and advantages, as well as others, will become more readily apparent to those of ordinary skill in the art by reference to the following detailed description and accompanying drawings. While it would be desirable to provide a compact electric machine that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 8B shows an enlarged view of one portion of one of the end turns of FIG. 8a;

DESCRIPTION

Figure 1:
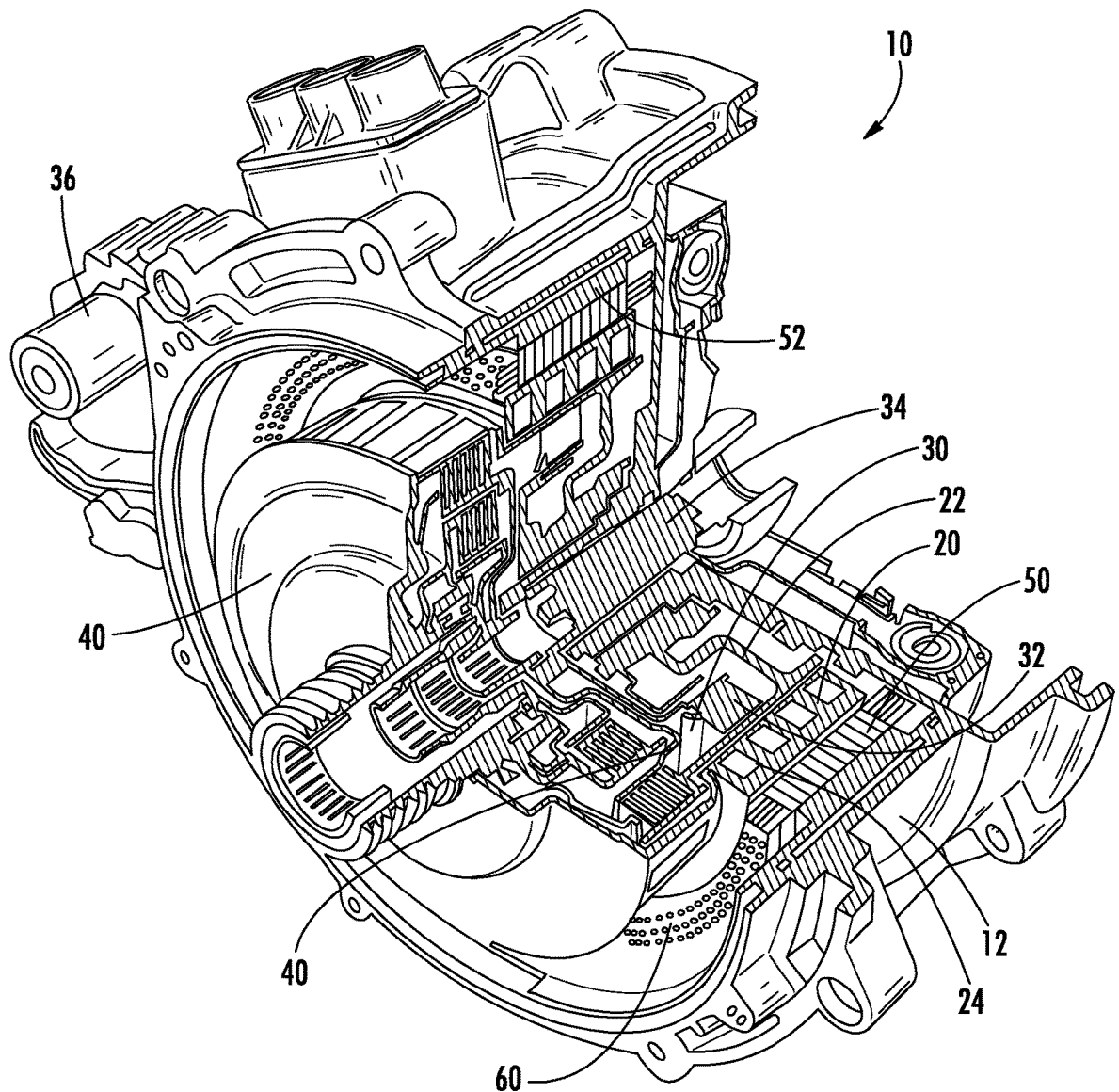
FIG. 1 shows a perspective cutaway view of an electric machine having a stator assembly with a compact configuration.

With reference to FIG. 1, an electric machine 10 is shown. The electric machine 10 includes a housing 12 that encloses a rotor 20 and a stator assembly 50. An engine disconnect clutch 30 is positioned inside of the rotor 20. The stator assembly 50 includes a core 52 with distributed windings 60 arranged on the core 52. The distributed windings 60 have a low end-turn height relative to the outer diameter of the stator core, thus providing for a low-profile stator configured to fit within a compact space, such as a compact vehicle space.

The rotor 20 of the electric machine 10 includes a rotor housing 22 including an outer surface defining an outer diameter for the rotor 20 and an inner surface defining an interior diameter for the rotor 20. The rotor 20 further includes a plurality of permanent magnets 24 embedded in the rotor housing 22. However, in alternative embodiments, the electric machine may not be a permanent magnet machine, but may be another type of machine, such as an induction machine, synchronous reluctance machine, etc.

Figure 7:
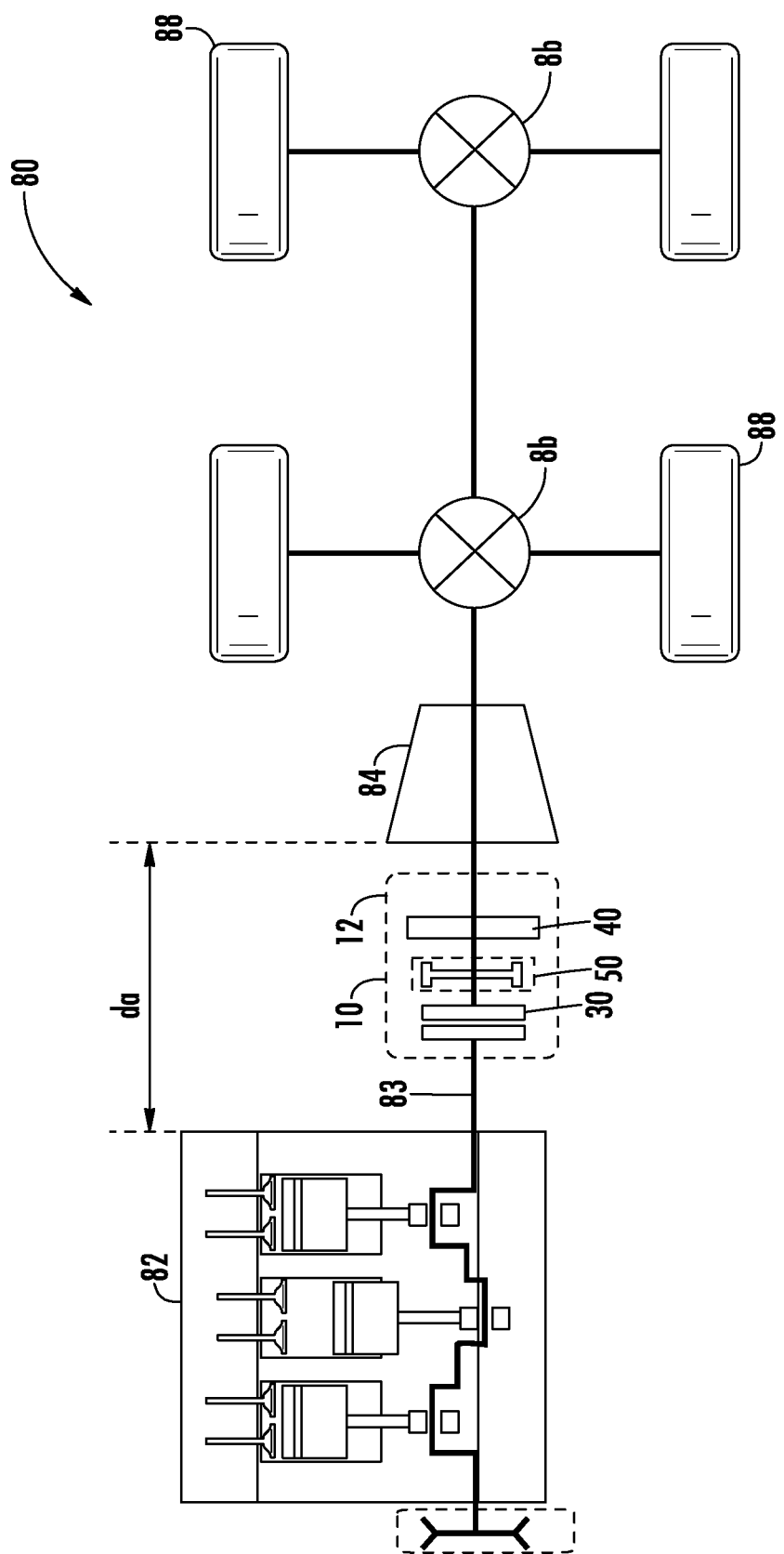
FIG. 7 shows a vehicle with the electric machine of FIG. 1 positioned therein.

The engine disconnect clutch 30 is positioned at least partially within the inner diameter of the rotor 20. The engine disconnect clutch 30 is configured to connect or disconnect the electric machine 10 and an engine (e.g., see the internal combustion engine 82 as shown in FIG. 7). In the embodiment of FIG. 1, the engine disconnect clutch is positioned completely within the inner diameter of the rotor 20. The engine disconnect clutch 30 may be provide in any of a number of forms, such as various types of friction clutches, or any of various other clutches. In at least one embodiment, the engine disconnect clutch 30 includes multiple plates 32, including a first set of plates that are locked to the rotor 20 and a second set of plates that are locked to a hub 34. When the clutch is open with the plates 32 disengaged, the hub 34 is free to rotate relative to the rotor 20; when the clutch is closed with the plates 32 engaged, the hub 34 is locked in rotation with the rotor 20.

In at least one embodiment, as shown in FIG. 1, a launch clutch 40 is also packaged in the housing 12 of the electric machine 10 adjacent to the rotor 20. The launch clutch 40 is configured to connect or disconnect the electric machine 10 and a transmission (e.g., see the transmission 84 as shown in FIG. 7). In the embodiment of FIG. 1, the launch clutch 40 is one clutch of a dual clutch arrangement. With the dual clutch arrangement, two clutches are provided and each clutch can be selectively engaged or disengaged to the transmission in order to change the gear reduction in the transmission (i.e., to shift gears). Each clutch can be selectively opened or closed (i.e., disengaged or engaged). Both clutches can be opened when the engine is running in order to allow the electric machine to generate electrical power without the vehicle being propelled. Similar to the disconnect clutch 20, the launch clutch 40 may also be provided in any of various forms. In the embodiment of FIG. 1, each of the dual clutches are provided as a friction clutch.

A clutch control module 36 is provided on the outside of the housing 12 of the electric machine. The clutch control module 36 includes electronics that control whether the engine disconnect clutch 30 and the launch clutch 40 are open or closed at any given time. The clutch control module 36 may also provide electronics configured to control the transmission, as noted in further detail below.

Figure 2:
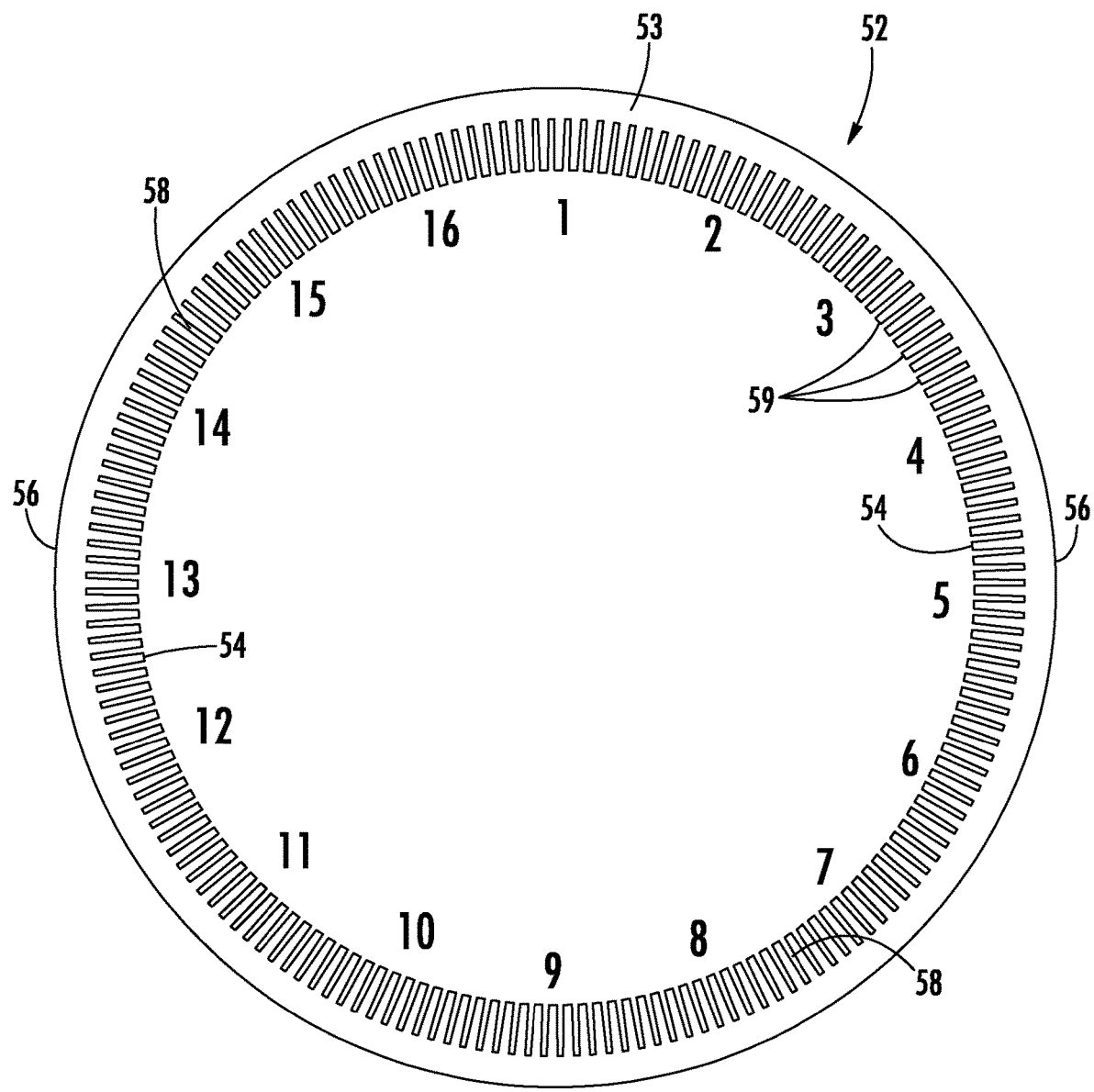
FIG. 2 shows a top view of a stator core of the stator assembly of FIG. 2.

With continued reference to FIG. 1, the rotor 20 of the electric machine 10 is configured to rotate within a stator assembly 50. The stator assembly 50 includes a core 52 with distributed windings 60 arranged on the core 52. The core 52 is generally cylindrical in shape and is comprised of a plurality of laminations. The laminations are generally annular in shape and are comprised of a ferromagnetic material. The laminations and are stacked one on top of another to form the complete core 52. As shown in FIG. 2, the stator includes an inner surface 54 and an outer surface 56. A plurality of slots 58 are formed between the inner surface 54 and the outer surface 56 with openings to the slots 58 provided on the inner surface 54. The slots 58 are separated by teeth 59 and extend longitudinally through the stator core 52 from one end to an opposite end. The slots are configured to receive the stator windings 60. In the embodiment of FIG. 2, the core 52 includes one hundred forty-four (144) slots configured to provide sixteen poles for the electric machine (as noted by numerals 1-16 in FIG. 2) when the stator windings 60 are wound thereon, each pole extending across nine slots of the stator core.

Figure 3:
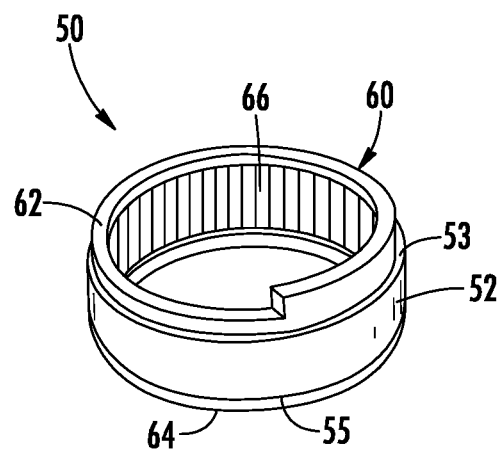
FIG. 3 shows a perspective view of the stator assembly of FIG. 1 in isolation from the electric machine.

The stator windings 60 of the electric machine 10 are formed from conductors inserted into the slots of the stator core 52. FIG. 3 shows the stator assembly 50 with the stator windings 60 positioned on the stator core. The stator windings 60 include a first end turn portion 62, a second end turn portion 64, and an in-slot portion 66. The first end turn portion 62 extends from one end 53 of the stator core 52, and the second end turn portion 64 extends from the opposite end 55 of the stator core 52. The in-slot portions 66 of the stator windings 60 extend through the slots 58 in the stator core from one end 53 to the opposite end 55.

The stator windings 60 are distributed stator windings which may be formed using any of various conductor arrangements. For example, in at least one embodiment, the distributed stator windings are formed as cascaded windings. Cascaded windings are typically from elongated conductor segments for each phase, the elongated conductor segments bent and then inserted radially into the slots of the stator core. An example of cascaded windings is shown in United States Patent Application Publication No. 2015/0054374, filed Aug. 23, 2013, the contents of which are incorporated herein by reference in their entirety. When a winding is cascaded, at least three consecutive conductor portions of each conductor segment are positioned in a same layer, with each layer defined by a conductor order in the radial direction of the stator core. An example of conductor portions in a cascaded winding arrangement is shown by the end turn portions of FIG. 4.

Figure 4:
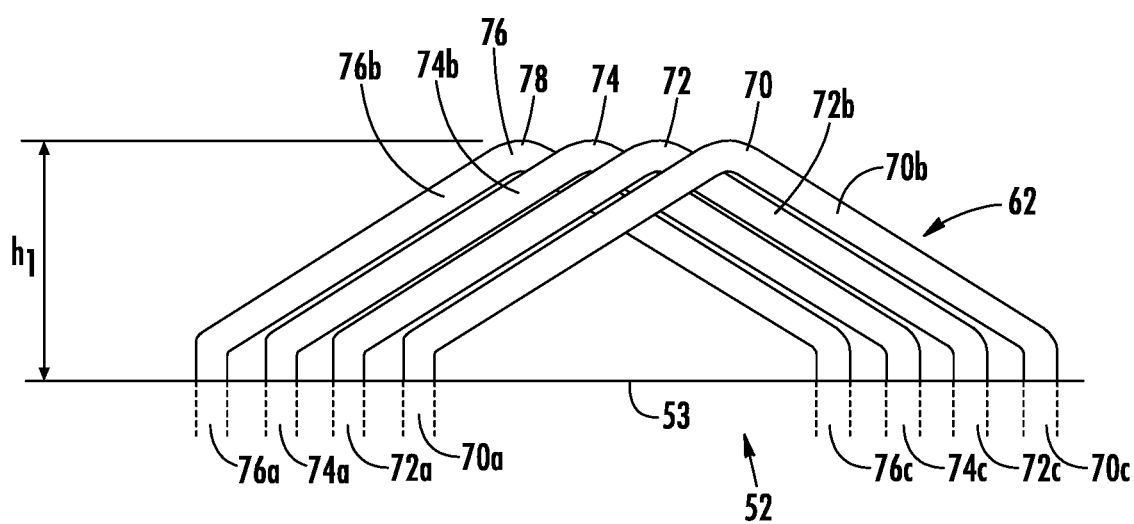
FIG. 4 shows a side view of four conductors of a distributed winding of the stator assembly of FIG. 3.

As shown in FIG. 4, four conductors providing end turn portions 62 of a winding arrangement extend from one end 53 of a stator core 52. The four conductors include an innermost conductor 70, a first intermediate conductor 72, a second intermediate conductor 74, and an outermost conductor 76. Each conductor shown in FIG. 4 includes a first in-slot portion, an end turn portion, and a second in-slot portion, all arranged in the same layer. For example, the outermost conductor 76 includes a first in-slot portion 76a in a fourth layer of one slot, an end turn portion 76b in a fourth layer of the end-turn, and a second in-slot portion 76c in a fourth layer of another slot. The first in-slot portion 76a is positioned in a first slot of the stator core 52. The end turn portion 76b is positioned outside of the stator core 52 and includes an apex 78. The second in-slot portion 76c is positioned in a second slot of the stator core 52 that is different from the first slot. The other conductors of FIG. 4 are arranged similarly, with the second intermediate conductor 74 arranged in a third layer, the first intermediate conductor 72 arranged in a second layer, and the innermost conductor 70 arranged in a first layer. Therefore, for a given conductor (e.g., 76), at least a first slot portion (e.g., 76a), the contiguous end turn portion (e.g., 76b), and the next contiguous slot portion (e.g., 76c) are all positioned in the same layer. During manufacture of this cascaded winding arrangement, each of the conductors may be placed into slots of stator core 52 in a sequential order. The conductors in a cascaded winding arrangement are, therefore, not interleaved. The conductors may also be formed of a continuous wire that extends one or more complete laps around the circumference of the stator core 52.

In at least one alternative embodiment, the windings are formed from a plurality of relatively short conductor segments that are formed as U-shaped conductors, each U-shaped conductor including two legs connected by an end turn portion. The legs of the U-shaped conductors are inserted longitudinally into the slots, leaving the end turns at one end of the stator core, and the legs are then connected at the opposite end of the stator core. Windings formed with U-shaped conductors segments may be interleaved (and not cascaded) with each leg of a U-shaped conductor positioned in a different layer of the slot (e.g. a first leg of the U-shaped conductor may be the first conductor in the slot, and the second leg of the U-shaped conductor may be the second conductor in a different slot). An example of such conductors is shown in U.S. Pat. No. 7,622,843, filed Jun. 11, 2007 and issued Nov. 24, 2009, the contents of which are incorporated herein by reference in their entirety.

As noted above, the stator windings 60 are distributed windings in the embodiments described herein. However, it will be recognized that the windings may be provided in any number of different configurations as will be recognized by those of skill in the art while also providing for an electric machine with desired performance characteristics. For example, the stator windings may be provided in a winding pattern that is a split-phase type, non-split phase type, or lap wound. If the stator windings are configured to provide a multi-phase winding arrangement, the stator winding may provide for three phases, five phases, six phases, or any other number of desired phases. The stator windings are arranged on the core to compliment a predetermined number of poles defined by the rotor, such as sixteen poles (as illustrated by numbers 1-16 positioned around the stator in FIG. 2), twenty poles, or twenty-four poles.

In the embodiments disclosed herein, it will be noted that the standard end turn pitch of the stator windings 60 is greater than seven. For example, in the embodiment of FIG. 4, the end turn pitch is nine. However, it will be recognized that in various embodiments different end turn pitches may be used, depending on the desired winding arrangement. The coil may also be a full-pitch coil or a fractional pitch coil, depending on the number of slots, poles and phases of the electric machine. In any event, when the standard end-turn pitch of the stator windings is relatively high (i.e., greater than seven), the ratio of the end-turn height to the outside diameter of the stator core is typically significantly greater than 0.07. However, as described in further detail below, in the various embodiments disclosed here, the ratio of the end-turn height to the outside diameter of the stator core is less than or equal to 0.07, resulting in a more compact stator assembly with a relatively low end-turn height.

In addition to the above, the conductors of the windings 60 are configured to provide a coil winding having a high slot fill factor (e.g., >63%) and using wire wherein at least two sides are substantially parallel to one another (e.g., rectangular wire). The conductors of the windings 60 may include a coating or other insulation provided on the conductor, such as an enamel type coating, a film-wrap type insulator, or a combination of enamel and film-wrap insulation.

In at least one embodiment, the stator windings are configured for use in an electric machine having a nominal voltage level between 24V and 120V, e.g., 24V, 48V, etc. In another embodiment, the stator windings may be configured for an electric machine having a different nominal voltage, such as between 120V and 360V, or 360V and 700V.

Figure 5:
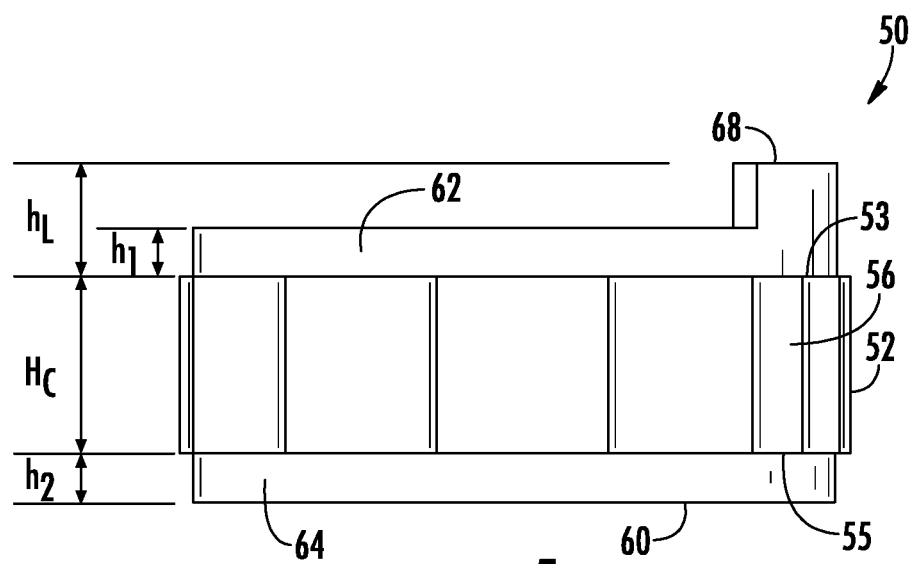
FIG. 5 shows a side view of the stator assembly of FIG. 3.
Figure 6:
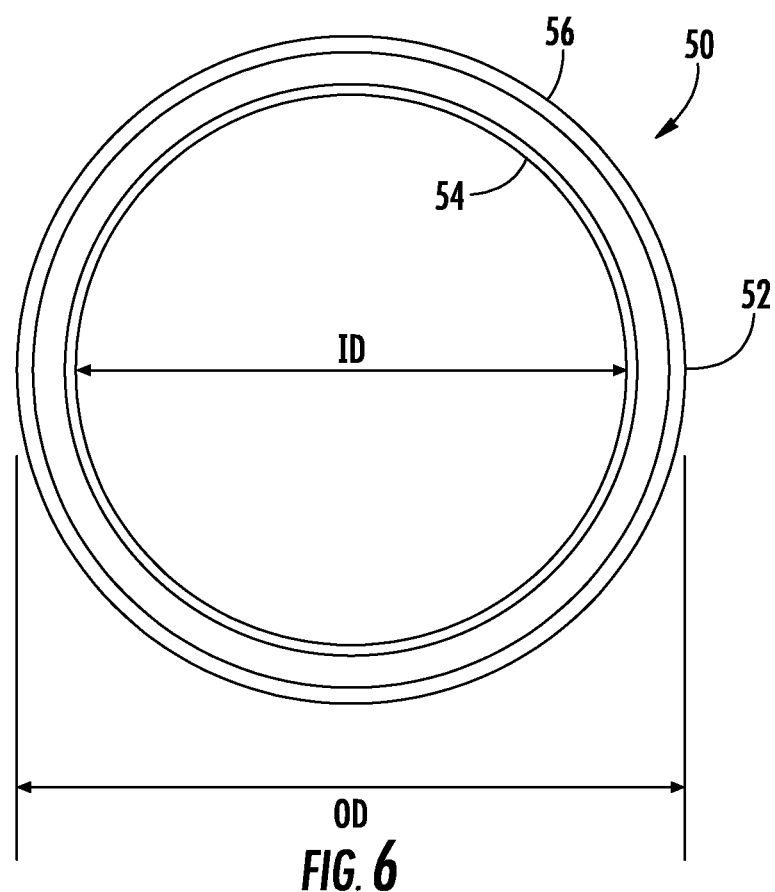
FIG. 6 shows a top view of the stator assembly of FIG. 3.

With reference now to FIGS. 5 and 6, a stator assembly 50 is shown with distributed windings 60 positioned on the stator core 52. The stator core 52 is defined by a core height $H_c$, an inside diameter ID, and an outside diameter OD. The core height $H_c$ is defined by the distance between the first end 53 and the second end 55 of the stator core 52. The inside diameter ID is defined by the diameter of a circle defined along the inner surface 54 of the stator core 52. The outside diameter OD is defined by the diameter of a circle defined along the outer surface 56 of the stator core 52 (disregarding various abnormalities in protuberances and indentations that may be provided along the outer surface 56 of the stator core).

The distributed windings 60 are defined by an in-slot portion 66 (not shown in FIG. 5) having a height that is the same as $H_c$, an end turn portion 64 having a height $h_2$, and a lead portion 68 having a height $h_L$. The height $h_2$ is the distance from one end 55 of the stator core 52 to the apex of the conductors of the lower end turn portion 64 of the windings 60. The height $h_L$ of the lead portion 68 is the distance from another end 53 of the stator core 52 to the ends of the leads extending from the upper end turn portion 62. The upper end turn portion is also defined by a height $h_1$ that is the distance from the end 53 of the stator core 52 to the apex of the conductors of the first end turn portion 62. In various embodiments, the height $h_1$ may be the same as or different than the height $h_2$. It will be recognized that because of small abnormalities in the heights of the conductors at the apex, the heights $h_1$ and $h_2$ may be defined by a mean, median or mode of the distances from the end 53 or 55 to the stator core to the apex of each conductor on the end turn portion 62 or 64.

With continued reference to FIGS. 5 and 6, in at least one embodiment the outside diameter OD of the core is 270 mm, the core height $H_c$ is 60 mm, the heights $h_1$ and $h_2$ are 17.6 mm, and the height $h_L$ of the lead portion is 39 mm. The ratio of the end turn height $h_1$ or $h_2$ of the windings to the outside diameter OD of the core is 17.6/270=0.065 (which is less than the stated ratio of 0.07). However, it will be recognized that numerous other embodiments of the stator assembly with different dimensions for the stator core and the windings are possible. For example, in at least one embodiment, the OD is the stator core is less than or equal to 180 mm (i.e., OD≤180), and the smallest end turn height is less than or equal to 12.5 mm (e.g., $h_1$≤12.5), with the ratio of $h_1$/OD of approximately 0.07 or less (e.g., 12.4/179=0.069). As another example, in at least one embodiment, the OD is the stator core is less than or equal to 220 mm (i.e., OD≤220), and the smallest end turn height is less than or equal to 15.0 mm (e.g., $h_1$≤15.0), with the ratio of $h_1$/OD of approximately 0.07 or less (e.g., 14.9/219=0.068). As yet another example, in at least one embodiment, the OD is the stator core is less than or equal to 270 mm (i.e., OD≤270), and the smallest end turn height is less than or equal to 16.0 mm (e.g., $h_1$≤16.0), with the ratio of $h_1$/OD of approximately 0.06 or less (e.g., 15.9/269=0.059). As yet another example, in at least one embodiment, the OD is the stator core is greater than 270 mm (i.e., OD<270), and the smallest end turn height is less than or equal to 13.5 mm (e.g., $h_1$≤13.5), with the ratio of $h_1$/OD of approximately 0.05 or less (e.g., 13.4/271=0.049).

The stator assembly 50 including a stator core 52 with distributed windings 60 provided thereon is designed with specific dimensions that advantageously provide for a compact electric machine with desirable performance characteristics. In particular, in the embodiments disclosed herein an electric machine with distributed windings is designed and dimensioned to be compact such that the ratio of the shorter end-turn height $h_1$ or $h_2$ of the windings to the outside diameter OD of the core is less than or equal to 0.07, 0.06 or even 0.05. Stator assemblies 50 with distributed windings having these dimensions offer desirable performance features, including reduced acoustic noise and a relatively high pole count with low AC current losses. The arrangement is especially useful for implementation in particular hybrid electric vehicle applications.

With reference now to FIGS. 8A-8E, the equation for end turn height $H_T$ (i.e., the height of the end turn in an axial direction) can be mathematically defined (using trigonometry) to be:

$$\text{Theta} = \arcsin((C+W)/a) \quad 1)$$

$$H_T = L + H1 + H3 + H2 + W \quad 2)$$

i.e., $H_T = L + [\cos(\text{theta})*R1] + [1-\cos(\text{theta})*R2] + [\tan(\text{theta})*((a*P/2) - X1 - X2)] + W$ Where:

$$X1 = R1 - \sin(\text{theta})*R1 \quad 3)$$

Figure 8A:
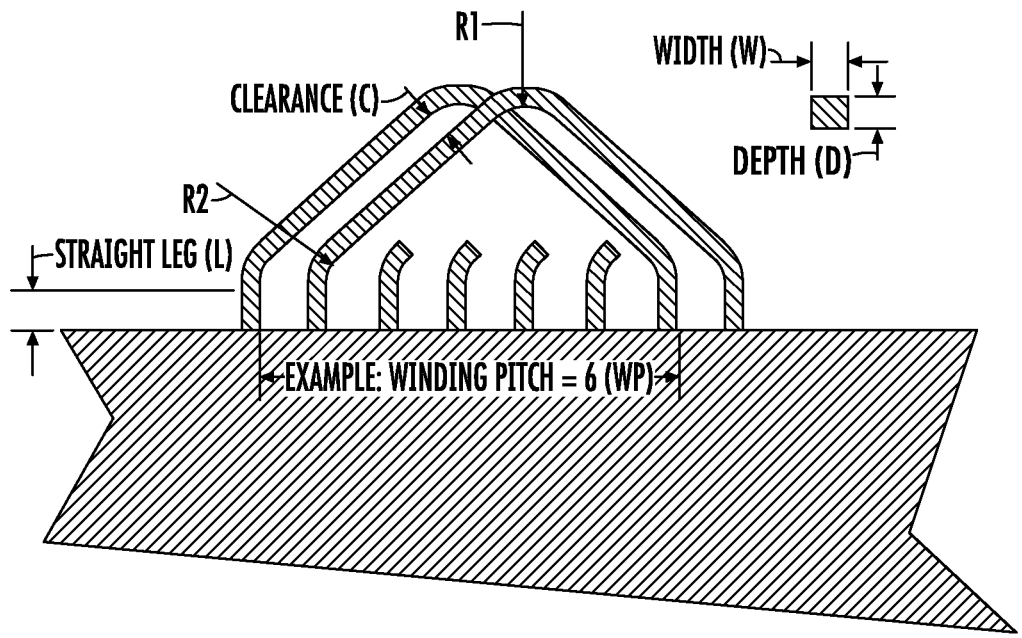
FIG. 8A shows a side view of two end turns of the stator assembly of FIG. 3.
Figure 8B:
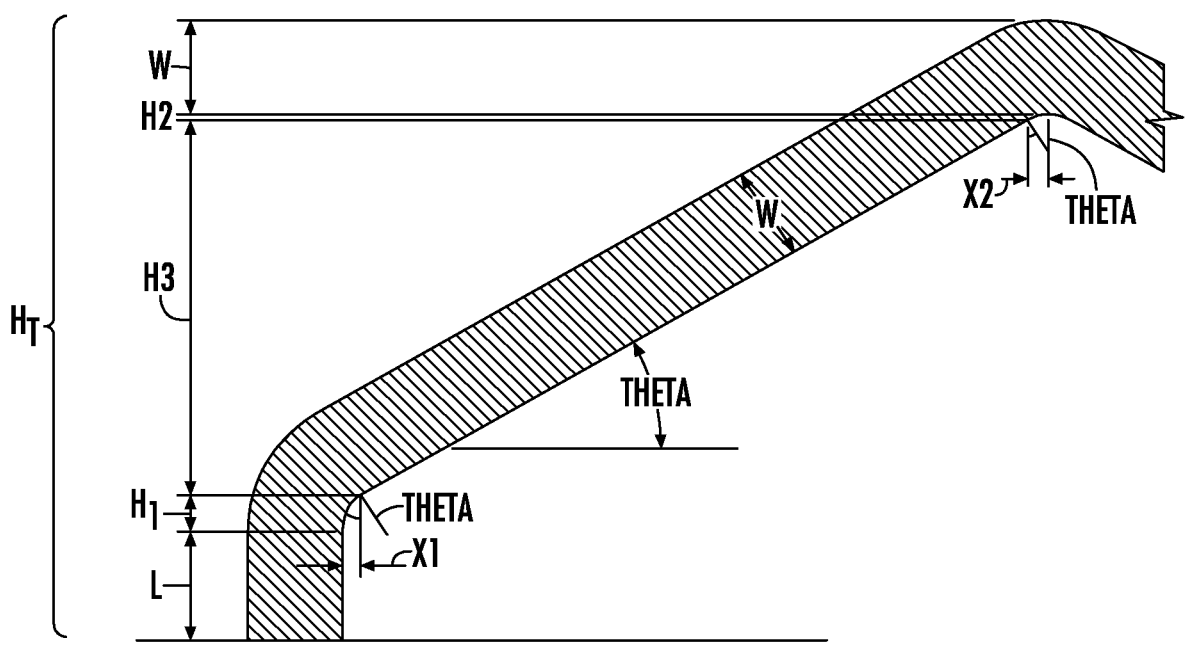

(as shown in FIGS. 8A and 8B, R1 is the inner radius that defines the upper curve/apex of the end turn, and X1 is the circumferential distance spanned by the inner radius that defines the upper curve/apex)

$$X2 = \sin(\text{theta})*R2 \quad 4)$$

(as shown in FIGS. 8A and 8B, R2 is the inner radius that defines the lower curve of the end turn closest to the stator core, and X2 is the circumferential distance spanned by the inner radius that defines the lower curve)

$$a = PI*D/\text{\# of slots} \quad 5)$$

(as shown in FIGS. 8A and 8B, D is the depth of each end turn conductor in a radial direction)

$$\text{\# of slots} = \text{\# of poles}*\text{\# of phases}*\text{\# of slots per pole per phase} \quad 6)$$

$$W = \text{the width of each end turn conductor} \quad 7)$$

(as shown in FIGS. 8A and 8B)

$$C = \text{the clearance between end turn conductors in the end turn} \quad 8)$$

(as shown in FIG. 8A)

$$L = \text{the distance of the straight leg} \quad 9)$$

(i.e., the distance from the surface of the stator core (such as the first end 53) to the to the lower curve of the end turn)

$$H_1 = \text{the axial height of the inner radius that defines the lower curve of the end turn closer to the stator core} \quad 10)$$

$$H_2 = \text{the axial height of the inner radius that defines the upper curve/apex of the end turn} \quad 11)$$

$$H_3 = \text{the axial height of the end turn segment between } H_1 \text{ and } H_2 \quad 12)$$

Figure 8C:
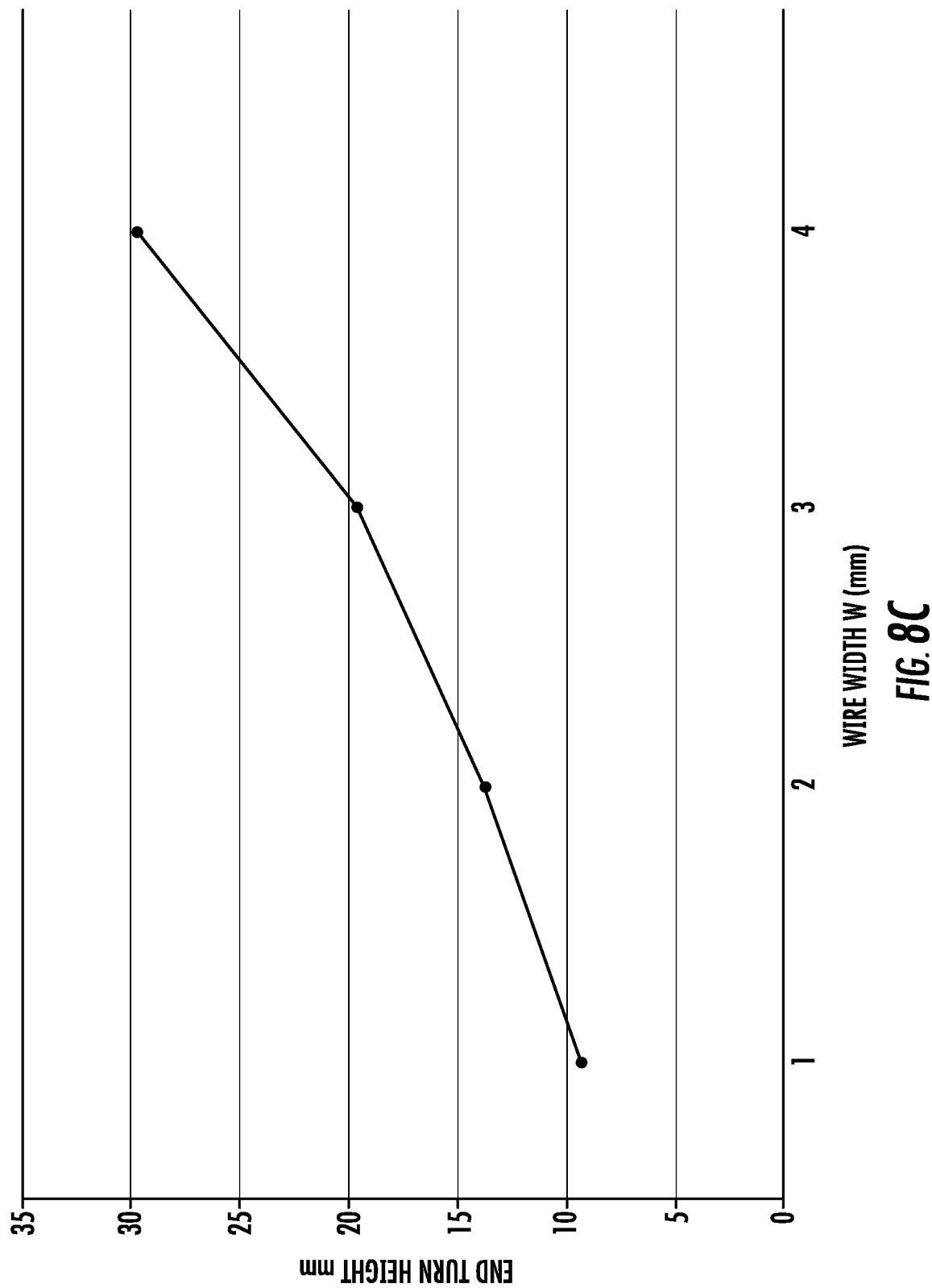
FIG. 8C shows a plot of end turn height ($H_T$) vs. wire/conductor width (W)

For a given design, plugging in different values of W yields the chart in FIG. 8C. FIG. 8C shows wire width W has a great impact on end turn height. However, reducing wire width W, increases the stator phase resistance (ohms) because the resistance is proportional to length/area, where area for a rectangular wire equals wire width W times wire depth D. An increase of resistance is unacceptable for a given motor design as it leads to poor performance and motors overheating. It has been determined that increasing the # of poles allows the wire width W to be reduced without an unacceptable increase in the stator phase resistance. A motor with an increase in amount of poles allows the width W to be reduced because of the following reasons 1)-3), as set forth in the following paragraphs:

1) A motor with increased number of poles results in a stator having a reduced amount of stator wire turns because the open circuit voltage (sometimes referred to as back EMF or "BEMF") of a motor at any given speed, is proportional to the number of poles times the number of stator electrical turns.

2) Reducing the number of stator turns, results in a lower phase resistance (ohms) because the number of turns is proportional to the resistance squared of the wire. For example, doubling the number of turns doubles the wire length and halves the wire cross sectional area (in a given slot size) and wire resistance is proportional to wire length divided by wire cross sectional area.

3) With a lower phase resistance, the wire width W can be increased to bring the phase resistance ohms up to normal values without effecting motor performance or overheating.

Figure 8D:
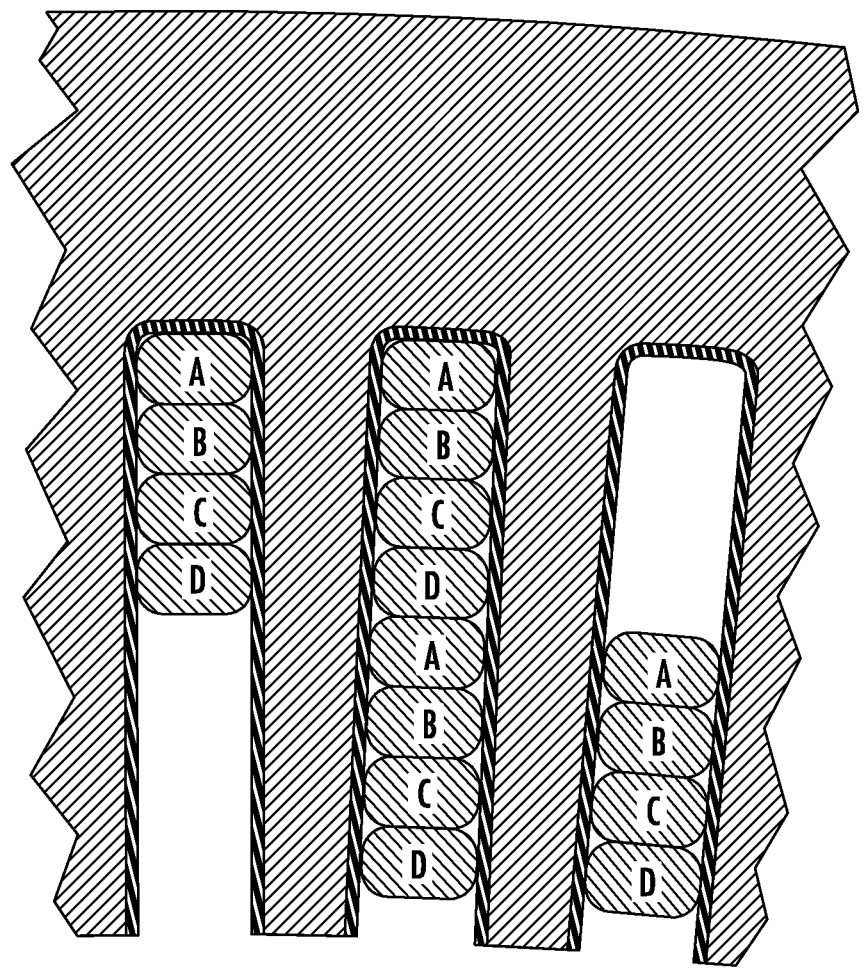
FIG. 8D shows a cross-sectional view of the conductors in slots of the core for one pole of an the stator assembly of FIG. 3.
Figure 8E:
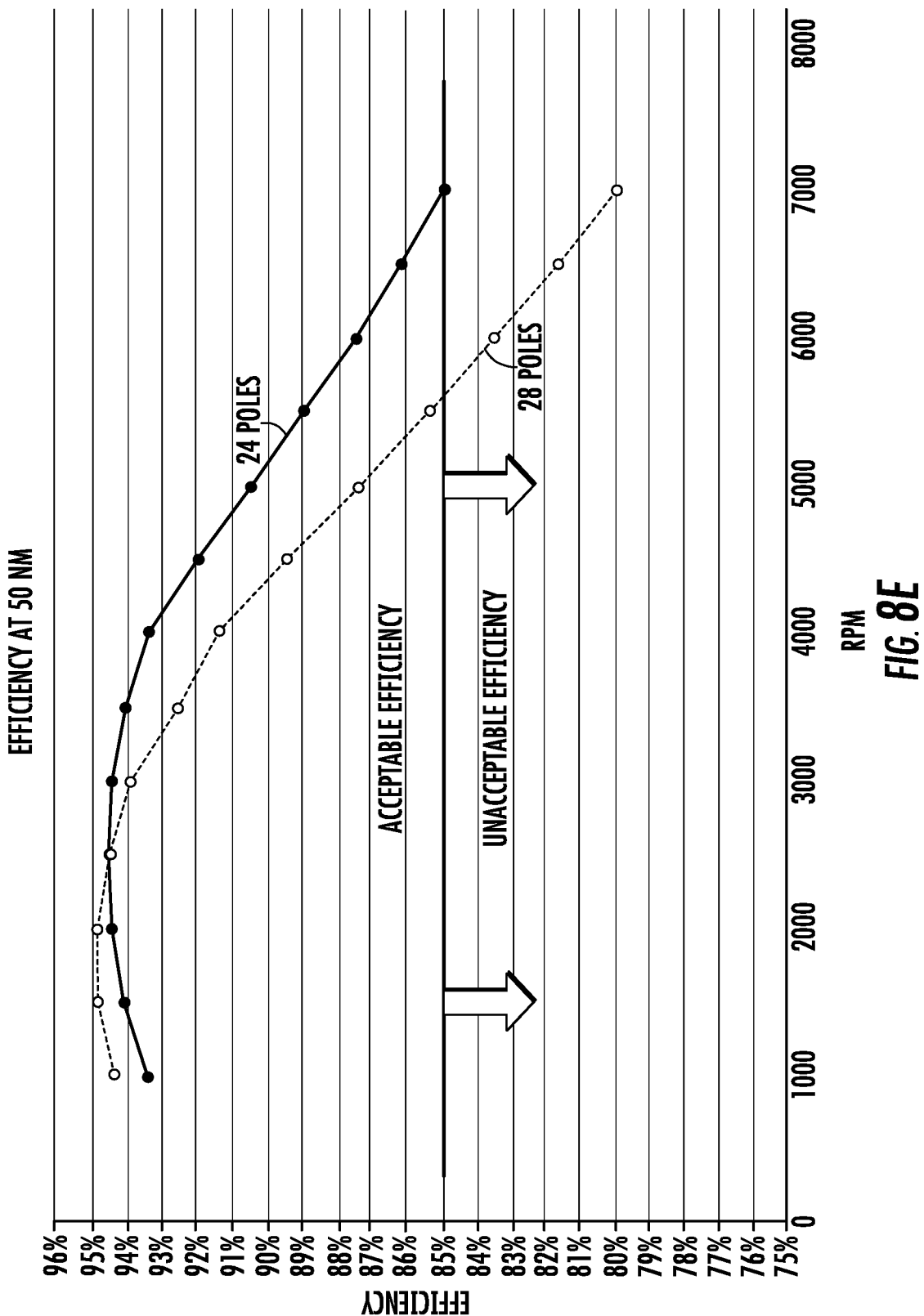
FIG. 8E shows a plot of efficiency vs. RPM for a first electric machine of 24 poles and a second electric machine having 28 poles.

Increasing the number of poles does have a negative impact. The negative impact is two losses—stator lamination eddy current losses and skin effect copper losses, which are proportional to the number of poles. As the number of poles are increased, these two losses are increased—greatly effecting the motor efficiency. It has been determined that there is a ceiling on sustainable eddy current and skin effect copper losses to maintain an efficiency that a hybrid engine can tolerate before the motor reaches threshold performance levels and over-heats. First the motor must be designed with multiple parallel wires so that the wire depth d is small. A small wire depth d reduces skin effect losses. Preferably the number of parallel wires is three or four but more can be used. FIG. 8D is a partial view of a stator having 2 slots per pole per phase and 4 parallel wires. Only the wires of one phase of one pole are shown. There are 8 wires in each slot and 16 wires in each pole (only one pole is shown). The number of slots per pole per phase equals the number of wires in a pole divided by the number of wires in a slot. So in this case the number of slots per pole per phase is 16/8=2. There are also 4 parallel wires—wire A, wire B, wire C and wire D. By definition, each wire has 4 turns because each wire has 4 slot segments in the pole that is shown. It has been determined that for an engine that red lines near 7000 RPM, and a motor has a 1:1 gear ratio (so the motor max speed is also 7000 RPM), the ceiling for tolerable total losses is reached at a motor with 24 poles. FIG. 8E shows the efficiency of a 24 pole and 28 pole motor at a certain torque (i.e., 50 NM in the graph of FIG. 8E). The efficiency of the 28 pole motor at the top speed 7000 RPM is below the acceptable efficiency line, which causes the motor to not acceptably be cooled by the engine cooling system and causing the motor to overheat. Therefore the 1:1 geared, hybrid traction motor (with a max speed of 7000 RPM) with the shortest end turn height and having sustainable losses, is a motor with 20-24 poles.

Finally to make the wire easy to manufacture, it is desirable to have a wire size that is roughly 2 mm wide (W) and 1.5 mm depth (D). To achieve the W of 2 mm, the wire must be divided into multiple slots per pole per phase. The number of slots in a stator lam for a stator having 2 slots per pole per phase is 2 times the number of phases and the number of poles. For example a stator having 2 slots per pole per phase, 3 phases and 24 poles will have 144 slots (i.e., 2×3×24=144). Note that increasing the number of slots per pole per phase does reduce the wire width W but it does not necessarily reduce the end turn height because the winding pitch increases.

With reference now to FIG. 7, in at least one embodiment, the electric machine 10 is positioned within a hybrid electric vehicle (HEV) 80. The HEV 80 includes an engine 82, the electric machine 10, a transmission 84, one or more differentials 86, and vehicle drive members in the form of vehicle wheels 88. The electric machine 10 is positioned between the engine 82 and the transmission 84. As described above, the electric machine 10 includes a stator assembly 50 with a rotor arranged therein. A number of clutches are retained with the housing 12 of the electric machine 10 including an engine disconnect clutch 30 and a launch clutch 40. The engine disconnect clutch 30 couples or uncouples the engine 82 to or from the electric machine 10, and the launch clutch 40 couples or uncouples the transmission 84 to or from the electric machine 10.

The engine 82 in the embodiment disclosed herein is an engine that may be used in association with vehicles, such as an internal combustion engine. It will be recognized that in at least one alternative embodiment, the engine 82 is provided by an alternative power source, such as a fuel cell. The engine 82 is configured to use any of various fuel sources such as gasoline, diesel, biofuel, etc. The engine includes an output shaft 83 that is coupled to the transmission 84 via the clutches 30 and 40 associated with the electric machine 10.

The transmission 84 may be any of various types of transmissions, such as an automatic step-ratio transmission, a continuously variable transmission, or an automated manual transmission. The transmission is connected to the drive wheels 88 in a conventional manner which may include one or more differentials 86, as shown in FIG. 7. The transmission may provide the vehicle with two drive wheels (e.g., front wheel drive or rear wheel drive) or four drive wheels (e.g., four wheel drive). The transmission is controlled using a transmission control unit to operate on a shift schedule that connects and disconnects elements within the gear box of the transmission to control the ratio between the transmission output and the transmission input. In at least one embodiment, the transmission control unit is provided by the control module 36 and is also configured to control operation of the engine disconnect clutch 30 and the launch clutch 40, as well as various other components within the transmission 84 or the housing 12 of the electric machine.

A relatively small space exists in the vehicle 80 between the engine 82 and the transmission 84. The space may be defined in general by an axial dimension and two radial dimensions. The axial dimension tends to be particularly limiting as a relatively small distance is provided between the engine and the transmission. For example in many HEVs the axial distance (e.g., $d_a$ as shown in FIG. 7) between the engine and the transmission is less than or equal to 500 mm, and often less than or equal to 150 mm. In these HEVs, the compact configuration of the electric machine 10 including a rotor 20 and stator assembly 50 with commonly housed engine disconnect clutch 30 and launch clutch 40, allows the entire housing 12 of the electric machine 10 to fit between the engine 82 and the transmission 84. The compact configuration of the electric machine is attributed in part to the distributed windings of the electric machine 10 wherein the ratio of the shorter end-turn height $h_1$ or $h_2$ of the windings to the outside diameter OD of the core is less than or equal to 0.07, 0.06 or even 0.05.

In operation, the electric machine 10 with distributed windings and a commonly housed engine disconnect clutch 30 and launch clutch 40, allows for various modes of operation. For example, if the launch clutch 40 is opened and the engine disconnect clutch is closed, the electric machine 10 may be used in a starting mode to start the vehicle engine 82. After the engine 82 has fired, the electric machine 10 may be used as a generator in a generation mode. If torque assist to the wheels 88 is required during operation of the vehicle, the electric machine may be placed in a motoring mode with the launch clutch 40 closed such that power is delivered to the transmission 84 and other components of the drivetrain. Alternatively, the electric machine may be placed in a power only mode with the engine disconnect clutch 30 open and the launch clutch closed, thus using only the electric machine to power the wheels 88 of the vehicle 80.

The foregoing detailed description of one or more exemplary embodiments of the electric machine stator with compact configuration has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A stator assembly comprising:
a stator core formed from a stack of laminations, each lamination defining an outside diameter and an inside diameter with slots formed there-between, wherein the stack of laminations defines longitudinally extending slots, wherein the inside diameter and the outside diameter of each lamination defines an outside diameter and an inside diameter of the stator core, the stack of laminations further defining a core height extending longitudinally from a first end to a second end of the stator core; and
distributed windings retained by the stator core, wherein the distributed windings include an in-slot portion positioned in the slots of the stator core, a first end turn portion adjacent to the first end of the stator core, and a second end turn portion adjacent to a second end of the stator core, wherein the first end turn portion defines a first end turn height extending from the first end of the stator core to a vertex of the first end turn portion, wherein a ratio of the first end turn height to the outside diameter of the stator core is less than or equal to 0.07, and wherein the distributed windings and the slots of the stator core are configured for use in association with an electric machine including at least twenty poles and at least four electrical turns defined by the distributed windings.

2. The stator assembly of claim 1 wherein the second end turn portion defines a second end turn height extending from the second end of the stator core to a vertex of the second end turn portion, and wherein the second end turn height is substantially equal to the first end turn height.

3. The stator assembly of claim 1 wherein the distributed windings are distributed interleaved stator windings.

4. The stator assembly of claim 1 wherein the distributed windings are multi-phase windings.

5. The stator assembly of claim 1 wherein the outside diameter is between 180 mm and 300 mm and wherein the first end turn height is between 12.5 mm and 21 mm.

6. The stator assembly of claim 1 wherein the ratio of the first end turn height to the outside diameter of the stator core is less than or equal to 0.06.

7. The stator assembly of claim 1 wherein the distributed windings and the slots of the stator core are configured for use in association with an electric machine including between 20 and 24 poles.

8. The stator assembly of claim 7 wherein the distributed windings are multi-phase windings, and wherein each phase of the multi-phase windings comprise a plurality of parallel wires.

9. The stator assembly of claim 8 where the stator has 2 slots per pole per phase, and wherein a number of the slots in the stator core is twice a value equal to a number of phases of the multi-phase windings multiplied by a number of poles of the electric machine.

10. The stator assembly of claim 9 where the stator has 144 slots.

11. The stator assembly of claim 1 wherein each pole defined by the distributed windings extends across multiple slots of the stator core.

12. The stator assembly of claim 11 wherein each pole extends across three or more slots of the stator core.

13. An electric machine comprising:
a rotor defining at least twenty poles;
a stator assembly having an outside diameter and an inside diameter, the rotor positioned within the inside diameter of the stator assembly, the stator assembly comprising a stator core formed from a stack of laminations, each defining the outside diameter and the inside diameter with longitudinally extending slots formed between the inside diameter and the outside diameter, the stator core further defining a core height extending longitudinally from a first end to a second end of the stator core, the stator assembly further comprising distributed windings having an in-slot portion and two end turn portions provided on opposite ends of the stator assembly, wherein a ratio of a height of at least one of the two end turn portions to the outside diameter of the stator assembly is less than or equal to 0.07, and wherein the distributed windings and slots of the stator core define at least twenty poles and four electrical turns and are configured for use in association with the rotor;
a first clutch positioned at least partially within the rotor; and
a second clutch positioned adjacent to the rotor;
wherein the stator assembly, the rotor, the first clutch and the second clutch are all retained in a common housing.

14. The electric machine of claim 13 wherein the outside diameter of the stator assembly is less than or equal to 270 mm and the height of at least one of the two end turn portions is less than or equal to 17 mm.

15. The electric machine of claim 14 wherein the outside diameter of the stator assembly is less than or equal to 220 mm and the height of at least one of the two end turn portions is less or equal to than 15 mm.

16. The electric machine of claim 13 wherein the outside diameter of the stator assembly is greater than or equal to 270 mm and the height of at least one of the two end-turn portions is less than 13.5 mm.

17. The electric machine of claim 13 wherein the ratio of the height of one of the two end turn portions to the outside diameter of the stator core is less than or equal to 0.05.

18. A vehicle comprising:
an engine having an output shaft;
a transmission coupled to the engine with a space defined between the transmission and the engine, the space is defined at least in part by an axial distance separating the engine and the transmission;
an engine disconnect clutch positioned in the space between the transmission and the engine, the engine disconnect clutch connected to the output shaft of the engine;

at least one vehicle drive member coupled to the transmission; and an electric machine positioned in the space between the transmission and the engine, the electric machine including a rotor and a stator assembly, the stator assembly including a stator core and distributed windings, and the engine disconnect clutch coupled to the rotor, the stator core including stator laminations, each lamination defining an outside diameter and an inside diameter of the stator assembly with longitudinally extending slots formed between the inside diameter and the outside diameter, the stator core further defining a core height extending longitudinally from a first end to a second end of the stator core, the rotor positioned within the inside diameter of the stator assembly, the distributed windings including an in-slot portion and two end turn portions provided on opposite ends of the stator assembly, wherein a ratio of a height of at least one of the two end turn portions to the outside diameter of the stator core is less than or equal to 0.07, and wherein the number of poles defined by the distributed windings of the electric machine is at least twenty and wherein the number of electrical turns defined by the distributed windings is at least four.

19. The vehicle of claim 18 wherein the engine disconnect clutch is positioned at least partially within the rotor, the vehicle further comprising a launch clutch positioned between the electric machine and the transmission.

20. The vehicle of claim 18, where the gear ratio between the engine and the electric motor is 1:1.

\* \* \* \* \*